United States Patent
Mansour et al.

(10) Patent No.: US 10,850,675 B2
(45) Date of Patent: Dec. 1, 2020

(54) STOWABLE ROOF RACK FOR A VEHICLE

(71) Applicant: Dura Operating, LLC, Auburn Hills, MI (US)

(72) Inventors: Amer Mansour, West Bloomfield, MI (US); Rafal Golab, Brandon Township, MI (US)

(*) Notice: Subject to any disclaimer, the term of this patent is extended or adjusted under 35 U.S.C. 154(b) by 116 days.

(21) Appl. No.: 16/105,021

(22) Filed: Aug. 20, 2018

(65) Prior Publication Data

US 2020/0055457 A1 Feb. 20, 2020

(51) Int. Cl.
*B60R 9/045* (2006.01)

(52) U.S. Cl.
CPC .................. *B60R 9/045* (2013.01)

(58) Field of Classification Search
CPC ........... B60R 9/052; B60R 9/05; B60R 9/045; B60R 9/058; B60R 9/04
USPC ....... 224/314, 553, 321, 510, 548, 549, 554, 224/534, 460, 459, 455
See application file for complete search history.

(56) References Cited

U.S. PATENT DOCUMENTS

| | | | |
|---|---|---|---|
| 6,811,066 B2* | 11/2004 | Aftanas | B60R 9/045 224/321 |
| 8,640,934 B2 | 2/2014 | Jamieson et al. | |
| 2006/0163297 A1* | 7/2006 | Moreau | B60R 9/045 224/321 |
| 2009/0321485 A1* | 12/2009 | Jamieson | B60R 9/04 224/309 |
| 2017/0320445 A1 | 11/2017 | Aftanas et al. | |

FOREIGN PATENT DOCUMENTS

FR 2886599 A1 * 12/2006 ............. B60R 9/045

* cited by examiner

*Primary Examiner* — Nathan J Newhouse
*Assistant Examiner* — Matthew T Theis
(74) *Attorney, Agent, or Firm* — Vivacqua Crane PLLC

(57) ABSTRACT

A stowable roof rack for a roof of a motor vehicle includes a first roof rail connected to the roof of the motor vehicle, the first roof rail having a first exterior side facing outwardly relative to the motor vehicle and a first interior side facing inwardly relative to the motor vehicle, a second roof rail connected to the roof of the motor vehicle spaced apart from substantially parallel the first roof rail, the second roof rail having a second exterior side facing outwardly relative to the motor vehicle and a second interior side facing inwardly relative to the motor vehicle, and a crossbar moveable between a stowed position and a deployed position, wherein when in the stowed position the crossbar is connected at a first end to the interior surface of the first roof rail and at a second end to the interior surface of the first roof rail, and wherein when in the deployed position the crossbar is connected at the first end to the interior surface of the first roof rail and at the second end to the interior surface of the second roof rail.

12 Claims, 7 Drawing Sheets

STOWABLE ROOF RACK FOR A VEHICLE

FIELD

The invention relates generally to a stowable roof rack for a motor vehicle, and more particularly to a stowable roof rack that includes a crossbar moveable between a stowed position and a deployed position.

BACKGROUND

The statements in this section merely provide background information related to the present disclosure and may or may not constitute prior art.

To increase the cargo capacity of a motor vehicle, a roof rack may be installed on the roof of the motor vehicle. Cargo may be secured to the roof rack which acts as a universal attachment point between the motor vehicle and the cargo. Examples of cargo include ski or snowboards, bikes, cargo cages, or cargo containers, to name but a few. The roof rack is typically attached directly to the roof panel of the motor vehicle.

The roof rack generally includes two roof rails attached to the roof of the vehicle with two or more crossbars extending above and between the roof rails. However, in certain conditions, it may be desirable to remove the crossbars, either to improve aerodynamics of the vehicle, improve aesthetics, or to attach different components to the roof rails. One solution is to have removable crossbars where the crossbars may be completely detached from the roof rails and stored in some separate location, such as motor vehicle trunk or outside the vehicle, such as in a garage. However, this may be undesirable in certain conditions where external or internal storage is not available. Another solution is to have crossbars that swing or pivot for stowage on the roof itself. However, with these systems the crossbars are not removable and are visible when viewed from the side of the vehicle. Thus, there is a need in the art for a stowable roof rack that addresses these and other issues.

SUMMARY

According to several aspects, a stowable roof rack for a roof of a motor vehicle includes a first roof rail connected to the roof of the motor vehicle, the first roof rail having a first exterior side facing outwardly relative to the motor vehicle and a first interior side facing inwardly relative to the motor vehicle, a second roof rail connected to the roof of the motor vehicle spaced apart from substantially parallel the first roof rail, the second roof rail having a second exterior side facing outwardly relative to the motor vehicle and a second interior side facing inwardly relative to the motor vehicle, and a crossbar moveable between a stowed position and a deployed position, wherein when in the stowed position the crossbar is connected at a first end to the interior surface of the first roof rail and at a second end to the interior surface of the first roof rail, and wherein when in the deployed position the crossbar is connected at the first end to the interior surface of the first roof rail and at a second end to the interior surface of the second roof rail.

In one aspect, the first interior side and the second interior side extend upward relative to the motor vehicle.

In another aspect, when in the stowed position, the crossbar is disposed below an upper edge of the first roof rail when viewed from a side of the motor vehicle.

In another aspect, the stowable roof rack includes a first storage bracket, a second storage bracket, a first support bracket and a second support bracket, wherein the crossbar is connected to the first storage bracket and the second storage bracket when in the stowed position and is connected to the first support bracket and the second support bracket when in the deployed position.

In another aspect, the first storage bracket and the second storage bracket are connected to the first interior side of the first roof rail.

In another aspect, the first support bracket is connected to the first interior side of the first roof rail and the second support bracket is connected to the second interior side of the second roof rail.

In another aspect, the first storage bracket is disposed forward, relative to the motor vehicle, of the first support bracket and the second support bracket.

In another aspect, the first storage bracket includes a first storage pin extending out from the first storage bracket substantially perpendicular to the first interior side of the first roof rail and the second storage bracket includes a second storage pin extending out from the second storage bracket substantially perpendicular to the first interior side of the first roof rail.

In another aspect, the first support bracket includes a first support pin extending from the first support bracket substantially parallel to the first interior side of the first roof rail and the second support bracket includes a second support pin extending from the second support bracket substantially parallel to the second interior side of the second roof rail.

In another aspect, the first support bracket includes a first flange and a second flange substantially perpendicular to the first flange, the first flange connected to the first interior side of the first roof rail and the first support pin extending from the second flange.

In another aspect, the crossbar includes a longitudinal member having a first distal end defining a first hole and a second distal end defining a second hole, the first hole and the second hole oriented substantially perpendicular to the longitudinal member and sized to receive the first support pin, the second support pin, the first storage pin, or the second storage pin.

In another aspect, a first bracket is connected to the first interior side of the first roof rail, a second bracket is connected to the first interior side of the first roof rail, and a third bracket is connected to the second interior side of the second roof rail.

In another aspect, the first bracket includes a support flange connected to the first interior side and a tray extending substantially perpendicular to the support flange, the tray defining a slot.

In another aspect, a pin extends through the slot and is connectable to the crossbar to secure the crossbar either in the stowed position or the deployed position.

In another aspect, the first roof rail includes a slot formed in the first interior side, the slot having at least one detent, and the first bracket is connected to the first roof rail by a detent stud disposed through the slot and having a portion sized to fit within the at least one detent.

In another aspect, a shield is disposed between the first interior side and the first bracket, the shield connected to the first bracket and positioned to substantially cover the slot in the first interior side.

In another aspect, when in the stowed position, the crossbar is connected to the first bracket and the second bracket, and when in the deployed position, the crossbar is connected to the first bracket and the third bracket.

In several other aspects, a stowable roof rack for a roof of a motor vehicle includes a first roof rail connected to the roof of the motor vehicle, the first roof rail having a first exterior side facing outwardly relative to the motor vehicle and a first interior side facing inwardly relative to the motor vehicle, a second roof rail connected to the roof of the motor vehicle and disposed substantially parallel to the first roof rail, the second roof rail having a second exterior side facing outwardly relative to the motor vehicle and a second interior side facing inwardly relative to the motor vehicle, a first storage bracket connected to the first interior side, a second storage bracket connected to the first interior side, a first support bracket connected to the first interior side, a second support bracket connected to the second interior side, and a crossbar moveable between a stowed position and a deployed position, wherein when in the stowed position the crossbar is connected at a first end to first storage bracket and at a second end to the second storage bracket, and wherein when in the deployed position the crossbar is connected at the first end to the first support bracket and at the second end to the second support bracket, and wherein when in the stowed position, the crossbar is disposed below an upper edge of the first roof rail when viewed from a side of the motor vehicle.

In one aspect, the first interior side and the second interior side of the roof rail are vertical relative to the motor vehicle and substantially planar.

In another aspect, the first storage bracket is disposed forward, relative to the motor vehicle, of the first support bracket and the second support bracket.

In another aspect, the first storage bracket includes a first storage pin extending out from the first storage bracket substantially perpendicular to the first interior side of the first roof rail, the second storage bracket includes a second storage pin extending out from the second storage bracket substantially perpendicular to the first interior side of the first roof rail, the first support bracket includes a first support pin extending from the first support bracket substantially parallel to the first interior side of the first roof rail and the second support bracket includes a second support pin extending from the second support bracket substantially parallel to the second interior side of the second roof rail.

In another aspect, the first storage pin, second storage pin, first support pin, and second support pin are identical in size.

In another aspect, the first support bracket includes a first flange and a second flange substantially perpendicular to the first flange, the first flange connected to the first interior side of the first roof rail and the first support pin extending from the second flange.

According to several other aspects, a stowable roof rack for a roof of a motor vehicle includes a first roof rail connected to the roof of the motor vehicle, the first roof rail having a first exterior side facing outwardly relative to the motor vehicle and a first interior side facing inwardly relative to the motor vehicle, a second roof rail connected to the roof of the motor vehicle and disposed substantially parallel to the first roof rail, the second roof rail having a second exterior side facing outwardly relative to the motor vehicle and a second interior side facing inwardly relative to the motor vehicle, a first bracket connected to the first interior side of the first roof rail, a second bracket connected to the first interior side of the first roof rail, a third bracket connected to the second interior side of the second roof rail, and a crossbar moveable between a stowed position and a deployed position, wherein when in the stowed position the crossbar is connected at a first end to the first bracket at a second end to the second bracket, and wherein when in the deployed position the crossbar is connected at the first end to the first bracket at the second end to the third bracket, wherein the crossbar is hidden by the first roof rail when viewed from a side of the motor vehicle.

In one aspect, the first interior side and the second interior side are vertical relative to the motor vehicle.

In another aspect, the first bracket includes a support flange connected to the first interior side and a tray extending substantially perpendicular to the support flange, the tray defining a slot.

In another aspect, a pin extends through the slot and is connectable to the crossbar to secure the crossbar either in the stowed position or the deployed position.

In another aspect, the first roof rail includes a slot formed in the first interior side, the slot having at least one detent, and the first bracket is connected to the first roof rail by a detent stud disposed through the slot and having a portion sized to fit within the at least one detent.

In another aspect, a shield is disposed between the first interior side and the first bracket, the shield connected to the first bracket and positioned to substantially cover the slot in the first interior side.

In another aspect, the second bracket and the third bracket are substantially identical to the first bracket.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
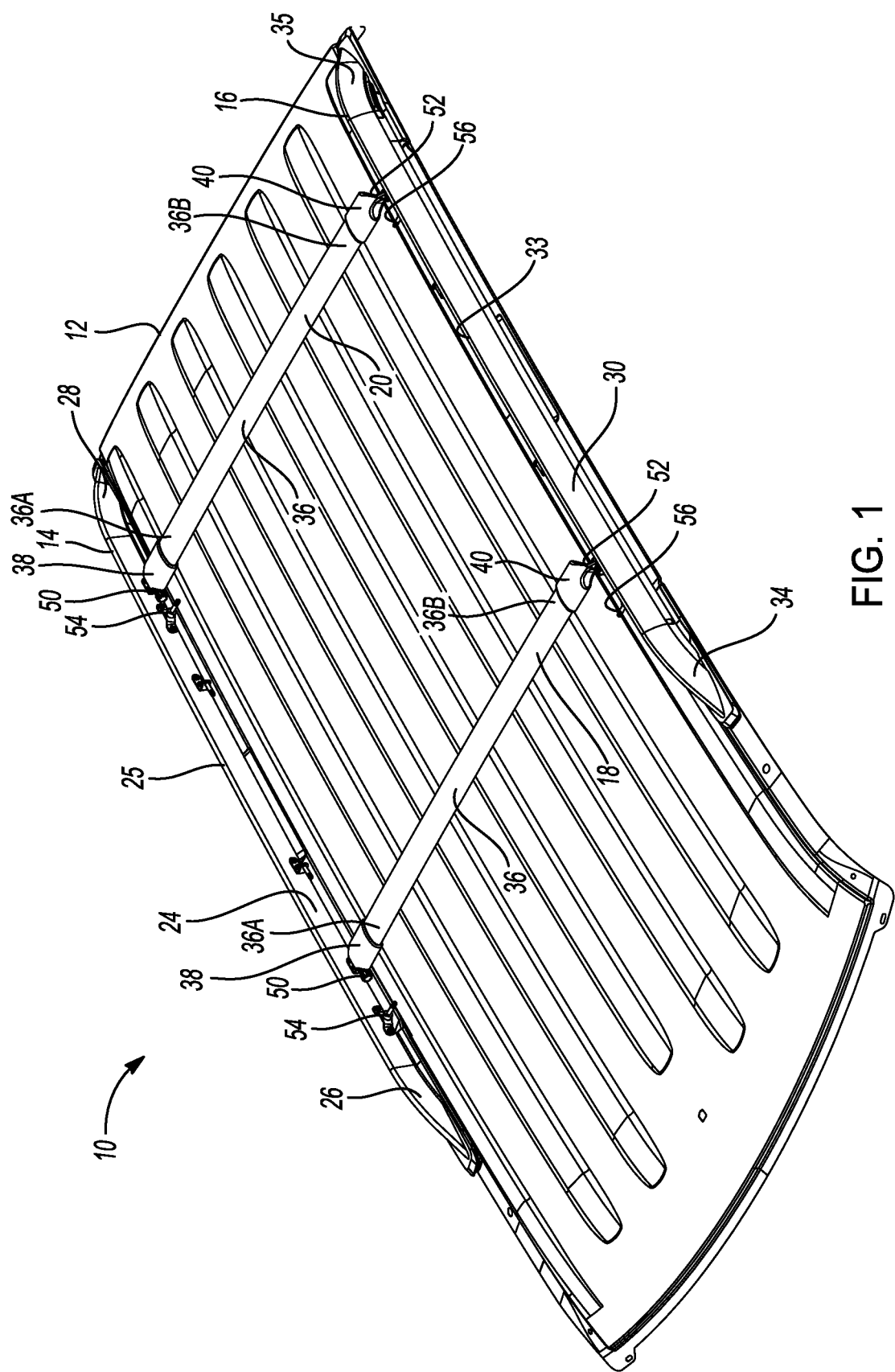
FIG. 1 is a top, perspective view of a stowable roof rack in a deployed configuration on an exemplary roof of a motor vehicle.
Figure 2:
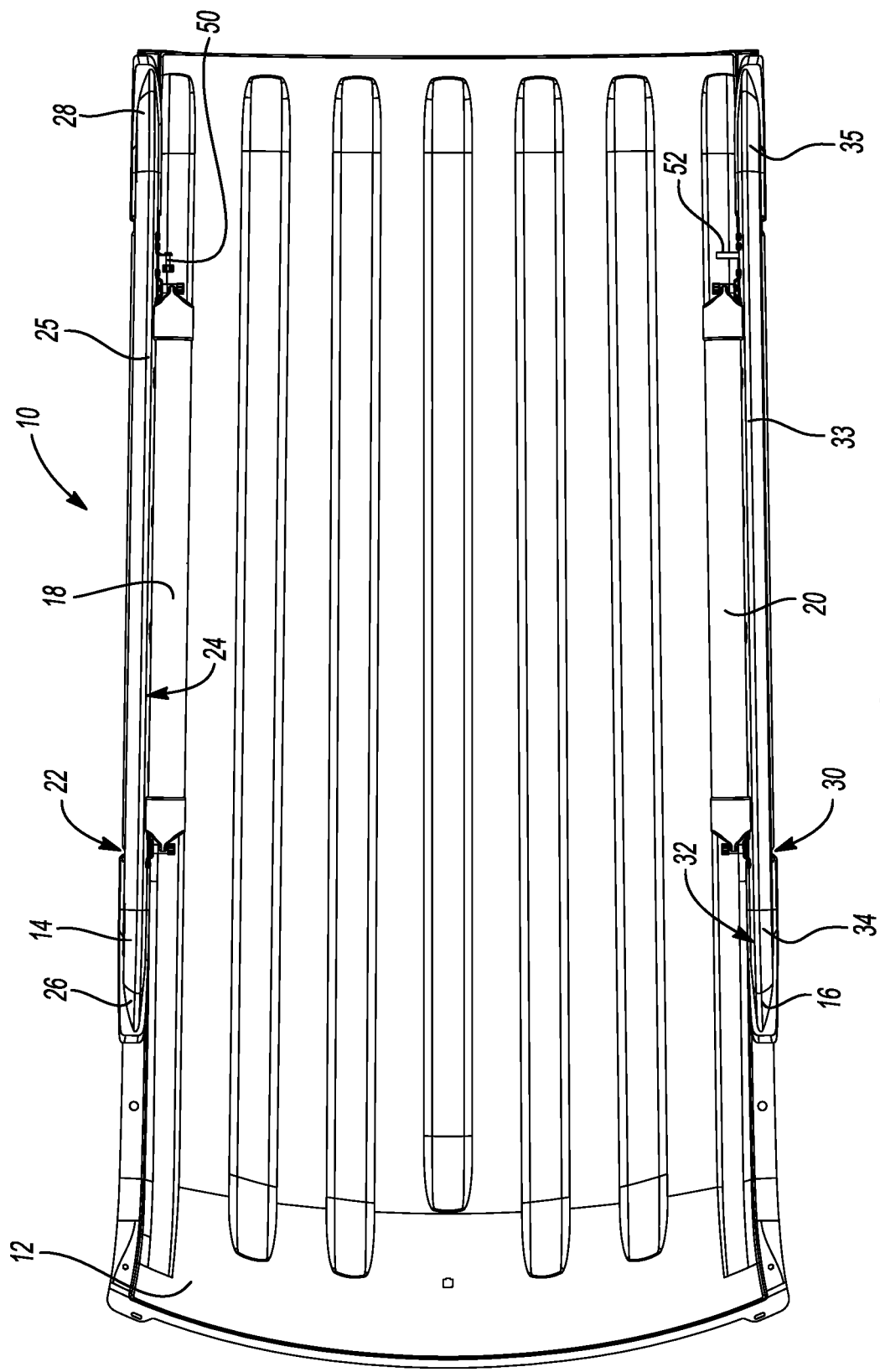
FIG. 2 is a top view of the stowable roof rack in a stowed configuration on an exemplary roof of a motor vehicle.

With reference to FIGS. 1 and 2, a stowable roof rack according to aspects of the present disclosure is generally indicated by reference number 10. The stowable roof rack 10 is attachable to a roof 12 of a motor vehicle. The roof 12 may have various sizes, shapes, lengths, contours, etc., without departing from the scope of the present disclosure. The stowable roof rack 10 generally includes a first roof rail 14, a second roof rail 16, a first crossbar 18, and a second crossbar 20. The roof rails 14, 16 are disposed on and connected to the roof 12 and are spaced apart approximately or substantially parallel to one another. As used herein and throughout the present disclosure, the term "approximately" or "substantially" is known to those skilled in the art. Alternatively, the term "approximately" or "substantially" may be read to mean plus or minus 15 degrees, or in an alternate embodiment, plus or minus 5 degrees. The crossbars 18, 20 are moveable between a deployed position, shown in FIG. 1, and a stowed position, shown in FIG. 2. When in the deployed position, the crossbars 18, 20 are connected at one end to one of the roof rails 14, 16 and at the other end to the other of the roof rails 14, 16 to provide a support frame for cargo, bikes, baskets, or any other object to be placed on the roof 12 of the motor vehicle. In the stowed position, the crossbars 18, 20 are connected at each end to the same roof rail 14, 16 as will be described in greater detail below.

The first roof rail 14 includes a first exterior side 22 facing outwardly relative to the roof 12 of the motor vehicle and a first interior side 24 facing inwardly relative to the roof 12 of the motor vehicle. The first exterior side 22 and the first interior side 24 extend upward relative to the roof 12 of the motor vehicle. A first upper surface 25 connects the first exterior side 22 to the first interior side 24. The first roof rail 14 also includes a first front distal end 26 and a first rear distal end 28 disposed longitudinally opposite the first front distal end 26. In addition, the first roof rail 14 may include various other components not specifically illustrated or described such as substrates, stanchions, covers, trim, lighting, etc., without departing from the scope of the present disclosure.

The second roof rail 16 includes a second exterior side 30 facing outwardly relative to the roof 12 of the motor vehicle and a second interior side 32 facing inwardly relative to the roof 12 of the motor vehicle. The second exterior side 30 and the second interior side 32 extend upward relative to the roof 12 of the motor vehicle and are preferably substantially planar. A second upper surface 33 connects the second exterior side 30 to the second interior side 32. The second roof rail 16 also includes a second front distal end 34 and a second rear distal end 35 disposed longitudinally opposite the second front distal end 34. In addition, the second roof rail 16 may include various other components not specifically illustrated or described such as substrates, stanchions, covers, trim, lighting, etc., without departing from the scope of the present disclosure.

In the example provided, each of the crossbars 18, 20 are substantially identical. Therefore, only one crossbar 18 will be described in detail. The crossbar 18 includes a longitudinal member 36 having a first extremity 36A and a second extremity 36B disposed longitudinally opposite the first extremity 36A. A first end or stanchion 38 of the crossbar 18 is connected to the first extremity 36A and a second end or stanchion 40 of the crossbar 18 is connected to the second extremity 36B. In one aspect, the stanchions 38, 40 are slidably connected to the longitudinal member 36 to adjust a total longitudinal length of the crossbar 18.

Figure 3:
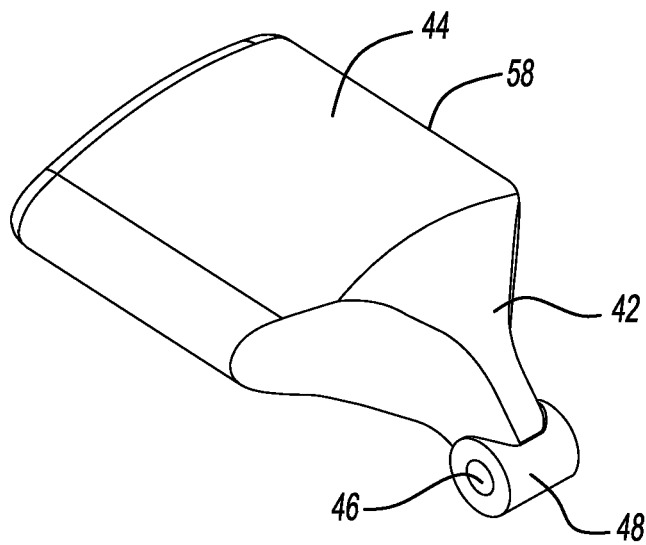
FIG. 3 is a perspective view of a stanchion.

Turning to FIG. 3, in the example provided, each of the stanchions 38, 40 are substantially identical. Therefore, only one stanchion 38 will be described in detail. The stanchion 38 includes a neck portion 42 that extends downward from a body portion 44 that receives the first extremity 36A of the longitudinal member 36. A hole 46 extends through a distal end 48 of the neck portion 42. The hole 46 is oriented substantially perpendicular to the longitudinal member 36.

To move the crossbars 18, 20 between the deployed position and the stowed position, the stowable roof rack 10 includes brackets connected to the roof rails 14, 16. When in the deployed position the crossbars 18, 20 are connected to a first set of these brackets, which include first support brackets 50 and second support brackets 52. The crossbars 18, 20 are detached from these support brackets 50, 52 and connected to a second set brackets, which include first storage brackets 54 and second storage brackets 56, when in the stowed position. The stowable roof rack 10 may have various numbers and combinations of brackets allowing for different locations of the crossbars 18, 20 along the length of the roof rails 14, 16. However, generally a minimum of two brackets per crossbar 18, 20 is required. The first support brackets 50 are connected to the first interior side 24 of the first roof rail 14. The second support brackets 52 are connected to the second interior side 32 of the second roof rail 16. The first storage brackets 54 are connected to the first interior side 24 of the first roof rail 14. The second storage brackets 56 are connected to the second interior side 32 of the second roof rail 16. In one aspect, the first and second storage brackets 54, 56 are disposed forward, relative to the roof 12 of the motor vehicle, of the first and second support bracket 50, 52.

Figure 4:
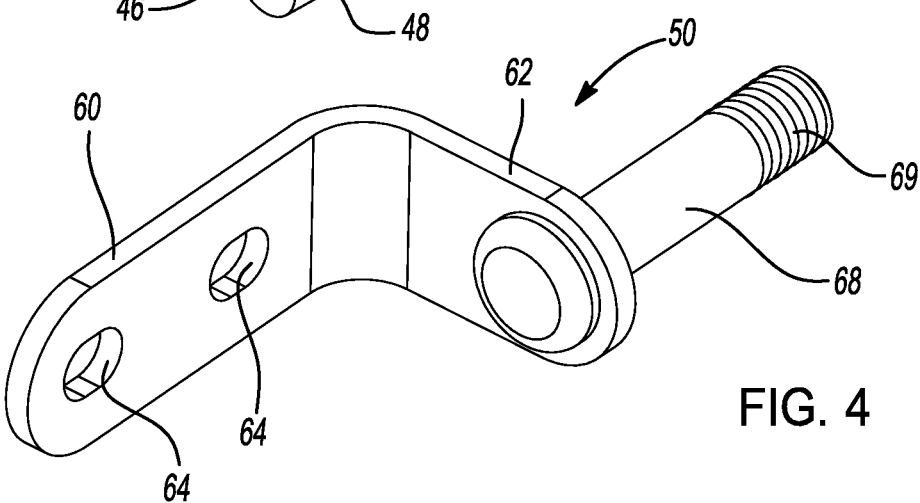
FIG. 4 is a perspective view of a support bracket.
Figure 5:
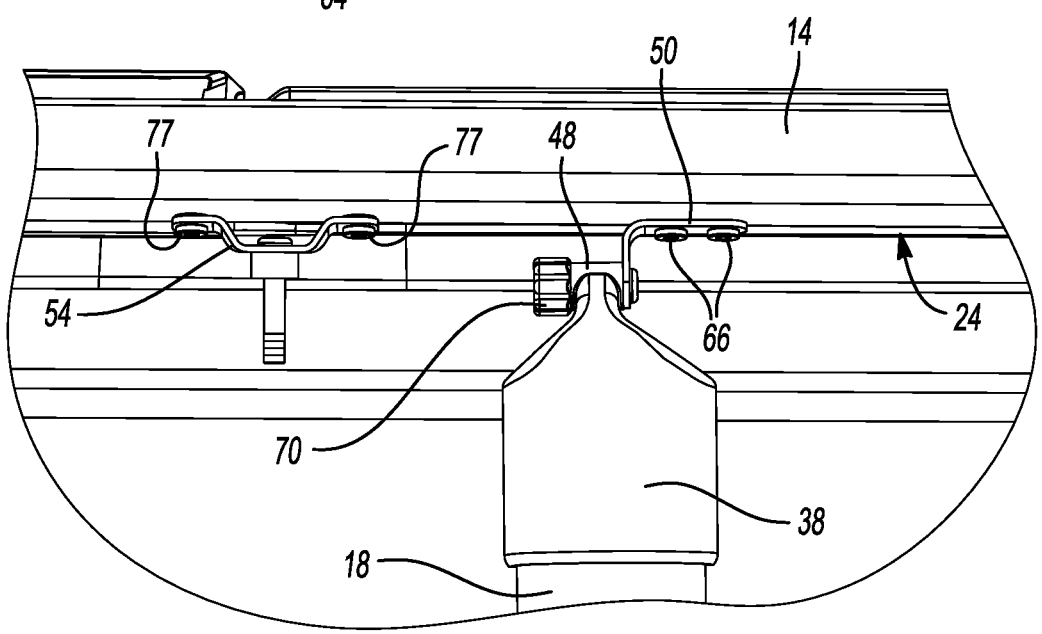
FIG. 5 is a top, enlarged view of a portion of the stowable roof rack in the deployed configuration.

Turning to FIGS. 4 and 5, in the example provided, each of the first and second support brackets 50, 52 are substantially identical. Therefore, only the first support bracket 50 will be described in detail. The first support bracket 50 includes a first flange 60 and a second flange 62 substantially perpendicular to the first flange 60. The first flange 60 includes connection holes 64 disposed therein for receiving fasteners 66 (shown in FIG. 5) to connect the first flange 60 to the first interior side 24 of the first roof rail 14. A support pin 68 extends out from the second flange 62. Thus, the support pin 68 is substantially parallel to the first interior side 24 of the first roof rail 14. Likewise, with respect to the second support bracket 52, the support pin 68 is substantially parallel to the second interior side 32 of the second roof rail 16. The support pin 68 is sized to be received within the hole 46 of the stanchions 38, 40 of the crossbars 18, 20. The support pin 68 preferably includes a threaded portion 69.

When the crossbar 18 is in the deployed position, the support pins 68 of the first and second support brackets 50, 52 are inserted into the holes 46 of the stanchions 38, 40. Due to the orientation of the holes 46 and support pins 68, the crossbar 18 extends across the roof 12 from the first roof rail 14 to the second roof rail 16. A graspable knob or locknut 70, which is threaded in the example provided, is then secured to the threaded portions 69 of the support pins 68 to secure the crossbar 18 to the first and second roof rails 14, 16. The crossbar 20 is attached in the deployed position in an identical manner using additional graspable knobs 70. The crossbars 18, 20 are detached by removing the additional graspable knobs 70 from the support pins 68.

Figure 6:
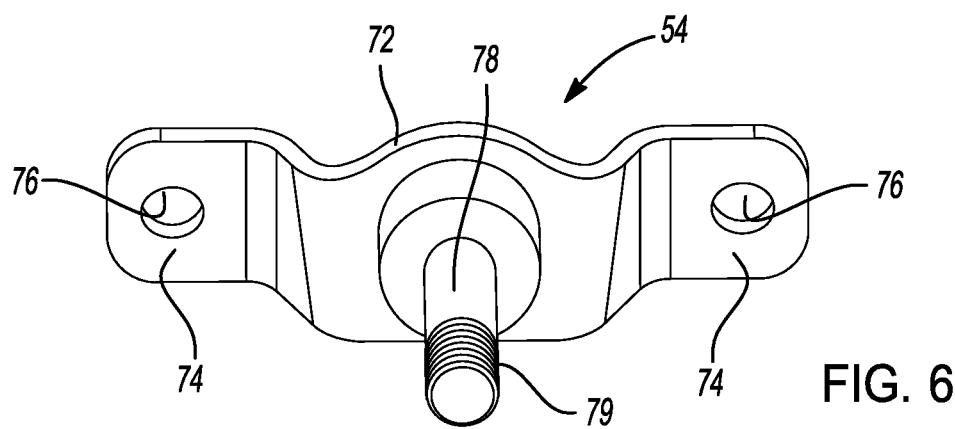
FIG. 6 is a perspective view of a storage bracket.
Figure 7:
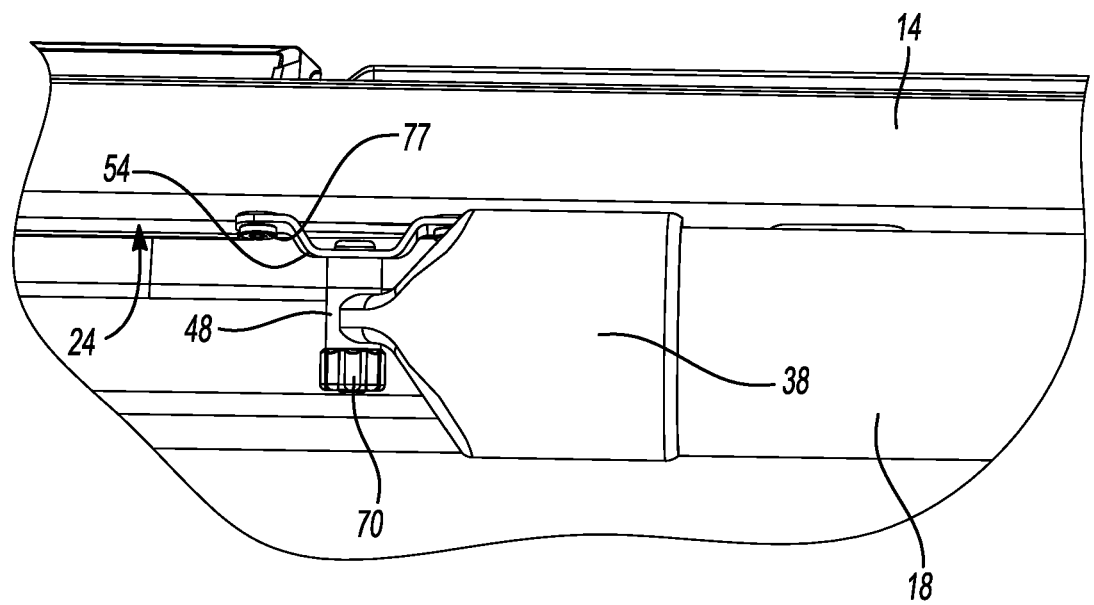
FIG. 7 is a top, enlarged view of a portion of the stowable roof rack in the stowed configuration.

With reference to FIGS. 6 and 7, in the example provided, each of the first and second storage brackets 54, 56 are substantially identical. Therefore, only the first storage bracket 54 will be described in detail. The first storage bracket 54 includes a center section 72 with side flanges 74 that each define connection holes 76 therein. The connection holes 76 receive fasteners 77 (shown in FIG. 7) to connect the side flanges 74 to the first interior side 24 of the first roof rail 14. A storage pin 78 extends out from the center section 72. Thus, the storage pin 78 is substantially perpendicular to the first interior side 24 of the first roof rail 14. Likewise, with respect to the second storage bracket 56, the storage pin 78 is substantially perpendicular to the second interior side 32 of the second roof rail 16. The storage pin 78 is sized to be received within the hole 46 of the stanchions 38, 40 of the crossbars 18, 20. The storage pin 78 preferably includes a threaded portion 79.

When the crossbar 18 is in the stowed position, the storage pins 78 of a pair of the first storage brackets 54 are inserted into the holes 46 of the stanchions 38, 40. Due to the orientation of the holes 46 and the storage pins 78, the crossbar 18 extends parallel with the first roof rail 14. The graspable knob or locknut 70 is then secured to the threaded portions 79 of the storage pins 78 to secure the crossbar 18 to the first roof rails 14. The crossbar 20 is attached in the stowed position to the second roof rail 16 using the second storage brackets 56 in an identical manner. The crossbars 18, 20 are detached by removing the graspable knobs 70 from the support pins 78.

While in the example provided the support pins 68 and storage pins 78 are threaded members that receive the graspable knobs 70 to secure the crossbar 16 in the stowed and deployed position, it should be appreciated that other types of releasable fastening systems may be employed. For example, the support pins 68 and storage pins 78 may not include the threaded portions 69, 79, respectively. Instead, the graspable knob 70 may be releasably snap fit onto the support pins 68 and storage pins 78, the graspable knob 70 may be releasably interference fit onto the support pins 68 and storage pins 78, or any other type of releasable fastening system.

Figure 8:
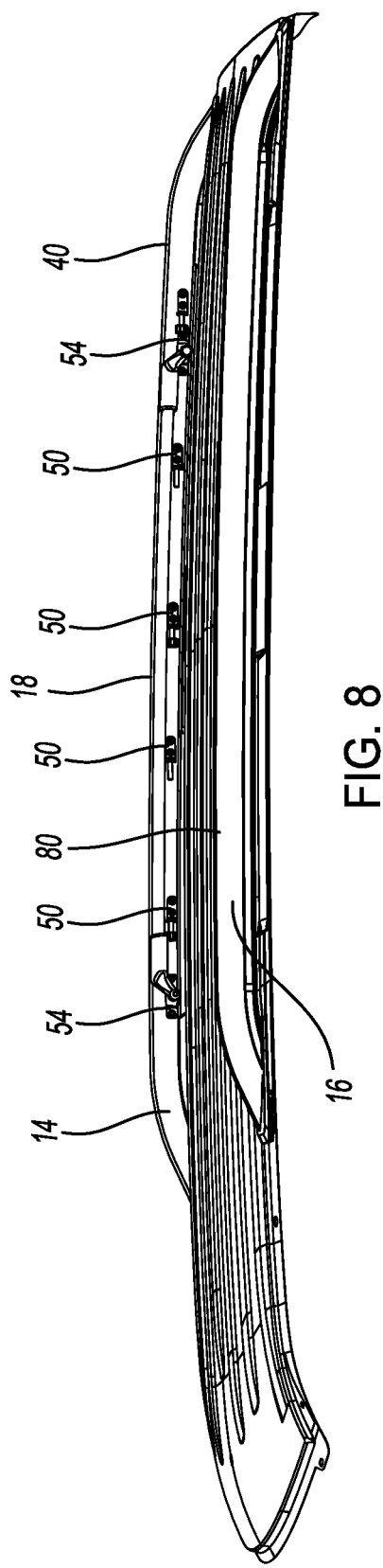
FIG. 8 is a side perspective view of the stowable roof rack on the exemplary roof in the stowed configuration.

Turning to FIG. 8, when in the stowed position, the crossbars 18, 20 are disposed overtop the support brackets 50, 52. In addition, when in the stowed position, the crossbars 18, 20 are disposed below an upper edge 80 of the roof rails 14, 16 when viewed from a side of the motor vehicle. Thus, the crossbars 18, 20 are substantially hidden when viewed from a side of the motor vehicle when in the stowed position. By securing the crossbars 18,20 to the first and second interior sides 24, 32 rather than the first and second upper surfaces 25, 33, no mounting hardware or holes are made in the first and second upper surfaces 25, 33. This has the advantage of improving the aesthetics of the roof rail 10 since the first and second upper surfaces 25, 33 are more visible than the first and second interior sides 24, 32. Additionally, when the crossbars 18, 20 are stowed, deployed or removed, no water or other debris will collect in the rail through the mounting holes. And, as noted above, connecting to the first and second interior sides 24, 32 allows the crossbars 18, 20 to be stowed below the upper edge 80 of the roof rails 14, 16 and thus hidden when viewed from the side of the vehicle.

With reference to FIGS. 9-12, an alternate embodiment of connecting the crossbars 18, 20 to the roof rails 14, 16 is shown. In this embodiment, the storage and support brackets 50, 52, 54, 56 are replaced with four identical brackets 100, the roof rails 14, 16 each include a bracket attachment system 102, and the stanchions 38, 40 are replaced with stanchions 104. Otherwise, like components are indicated by like reference numbers.

Figure 9:
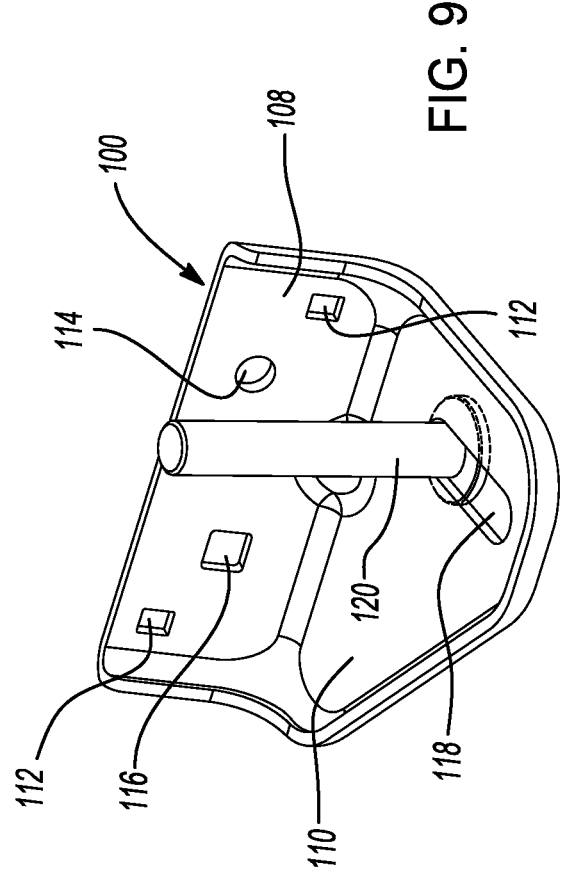
FIG. 9 is a perspective view of an alternate bracket.

Turning to FIG. 9, the bracket 100 includes a support flange 108 and a tray 110 extending substantially perpendicular to the support flange 108. The support flange 108 is connected to the roof rails 14, 16 via the bracket attachment system 102 as will be described in greater detail below. The support flange 108 defines a pair of shield slots 112, a support stud slot 114, and a detent stud slot 116. The tray 110 defines a pin slot 118 that receives a support pin 120 therein. The support pin 120 may be positioned within the pin slot 118 closer or farther away from the roof rails 14, 16, as required.

Figure 10:
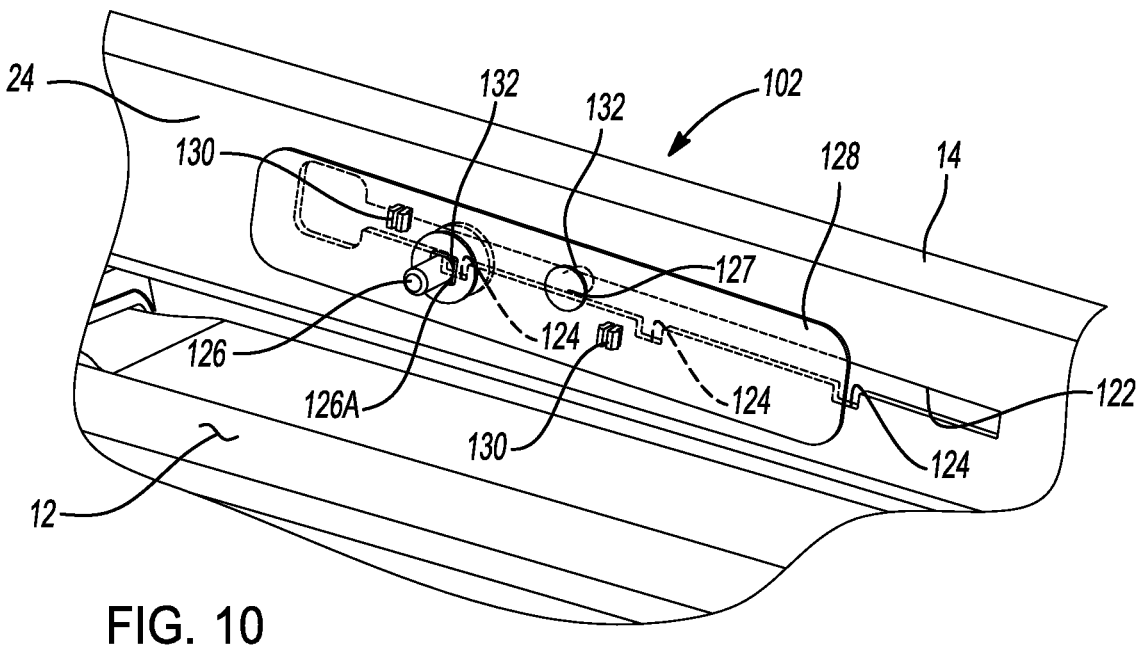
FIG. 10 is an inner perspective view of a bracket attachment system used with a roof rail.

With reference to FIG. 10, the bracket attachment system 102 will be described with respect to the first roof rail 14, it being understood that the bracket attachment system 102 is also used with the second roof rail 16. The bracket attachment system 102 includes a slot 122 formed in the first interior side 24. The slot 122 includes detent portions 124 along a length of the slot 122. In the example provided, the slot 122 includes three detent portions 124, though it should be appreciated that any number of detent portions 124 may be employed. A detent stud 126 is disposed through the slot 122. The detent stud 126 includes a detent 126A that is sized to fit within the detent portions 124 of the slot 122. A support stud 127 is also disposed through the slot 122. A shield 128 is disposed between the bracket 100 and the slot 122 to prevent material or debris from entering the slot 122. The shield 128 includes tabs 130 for engaging the bracket 100 via the shield slots 112. The shield 128 also includes openings 132 that allow the detent stud 126 and the support stud 127 to pass therethrough.

Figure 11:
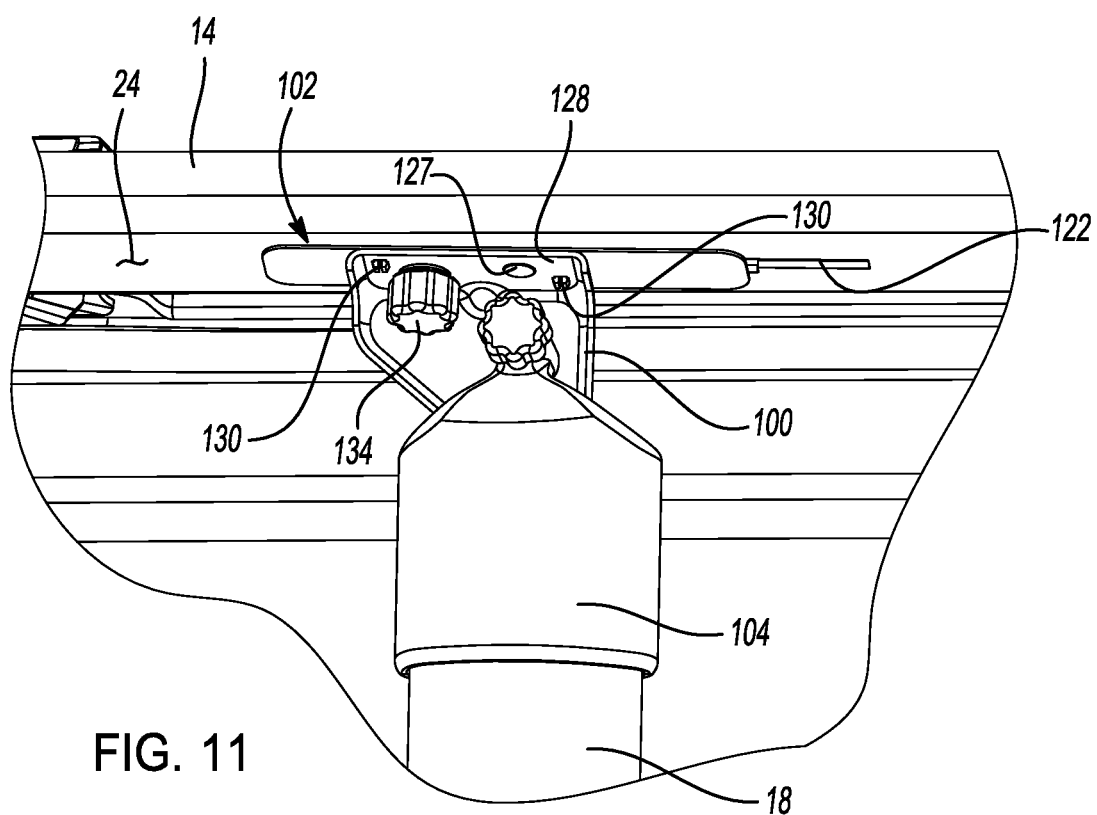
FIG. 11 is a top perspective view of the alternate bracket and bracket attachment system in a deployed configuration.
Figure 12:
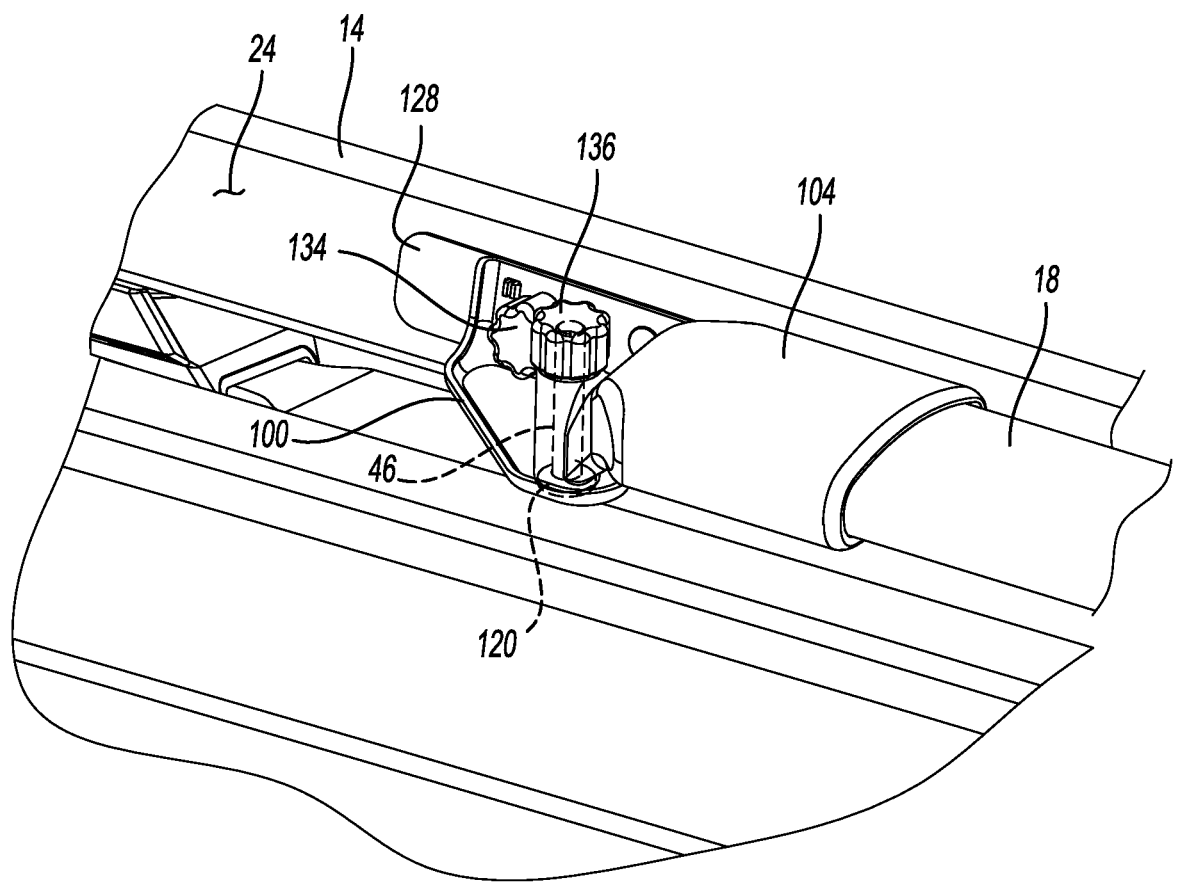
FIG. 12 is a side perspective view of the alternate bracket and bracket attachment system in a stowed configuration.

With reference to FIGS. 11 and 12, and continued reference to FIGS. 9 and 10, the bracket 100 is attached to the bracket attachment system 102 by the detent stud 126 and the support stud 127 that extend through the detent stud slot 116 and the support stud slot 114, respectively. A graspable threaded knob or locknut 134 is attached to the detent stud slot 116 to secure the bracket 100 to the first roof rail 14. By loosening the graspable threaded knob 134, the bracket 100 may slide along the slot 122 to the positions defined by the detent portions 124.

The stanchion 104 is similar to the stanchions 38, 40 however the hole 46 is oriented vertically relative to the crossbar 18, rather than horizontally as with the stanchions 38, 40. The crossbar 18 is secured to the bracket 100 by inserting the support pin 120 through the hole 46 and attaching a graspable threaded knob or locknut 136 to the support pin 120. The crossbar 18 may then be moved between the deployed position, shown in FIG. 11, and the stowed position, shown in FIG. 12, by loosening the graspable threaded knobs or locknuts 136 and repositioning the crossbar 18. Likewise, the crossbar 18 may be similarly repositioned.

The stowable roof rack 10 offers several advantages. The stowable roof rack 10 allows the crossbars 18, 20 to be completely removed from the roof 12 or alternatively secured to the roof rails 14, 16. When secured to the roof rails 14, 16, the crossbars 18, 20 are hidden by roof rails 14, 16 when viewed from the side. Finally, the brackets 50, 52, 54, 56, 100 are all adjustable along a length of the roof rails 14, 16 and provide customization to the stowable roof rack 10.

The terms "forward", "rear", "inner", "interior", "inwardly", "outer", "exterior", "outwardly", "above", "upper", "below", "lower", "downward", "vertically", "horizontally" and "upward" are terms used relative to the orientation of the motor vehicle as shown in the drawings of the present application. Thus, "forward" refers to a direction toward a front of a motor vehicle, "rearward" refers to a direction toward a rear of a motor vehicle, "inner", "interior", and "inwardly" refers to a direction towards the interior of a motor vehicle, "outer", "exterior", and "outwardly" refers to a direction towards the exterior of a motor vehicle, "below" refers to a direction towards the bottom of the motor vehicle, and "above" and "upper" refers to a direction towards a top of the motor vehicle, etc.

Additionally, in the claims and specification, certain elements are designated as "first", "second", "third", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The description of the invention is merely exemplary in nature and variations that do not depart from the gist of the invention are intended to be within the scope of the invention. Such variations are not to be regarded as a departure from the spirit and scope of the invention.

The following is claimed:

1. A stowable roof rack for a roof of a motor vehicle comprising:
   a first roof rail connected to the roof of the motor vehicle, the first roof rail having a first exterior side facing outwardly relative to the motor vehicle and a first interior side facing inwardly relative to the motor vehicle;
   a second roof rail connected to the roof of the motor vehicle spaced apart from and substantially parallel the first roof rail, the second roof rail having a second exterior side facing outwardly relative to the motor vehicle and a second interior side facing inwardly relative to the motor vehicle; and
   a crossbar moveable between a stowed position and a deployed position, wherein when in the stowed position the crossbar is connected at a first end to the first interior side of the first roof rail and at a second end to the first interior side of the first roof rail, and wherein when in the deployed position the crossbar is connected at the first end to the first interior side of the first roof rail and at the second end to the second interior side of the second roof rail,
   a first storage bracket, a second storage bracket, a first support bracket and a second support bracket, wherein the crossbar is connected to the first storage bracket and the second storage bracket when in the stowed position and is connected to the first support bracket and the second support bracket when in the deployed position, wherein the first storage bracket and the second storage bracket are connected to the first interior side of the first roof rail, wherein the first support bracket is connected to the first interior side of the first roof rail and the second support bracket is connected to the second interior side of the second roof rail, and wherein the first storage bracket includes a first storage pin extending out from the first storage bracket substantially perpendicular to the first interior side of the first roof rail and the second storage bracket includes a second storage pin extending out from the second storage bracket substantially perpendicular to the first interior side of the first roof rail.

2. The stowable roof rack of claim 1 wherein the first interior side and the second interior side extend upward relative to the motor vehicle, and a first upper surface connects the first interior side with the first exterior side, and a second upper surface connects the second interior side with the second exterior side.

3. The stowable roof rack of claim 1 wherein when in the stowed position, the crossbar is disposed below an upper edge of the first roof rail when viewed from a side of the motor vehicle.

4. The stowable roof rack of claim 1 wherein the first storage bracket is disposed forward, relative to the motor vehicle, of the first support bracket and the second support bracket.

5. The stowable roof rack of claim 1 wherein the first support bracket includes a first support pin extending from the first support bracket substantially parallel to the first interior side of the first roof rail and the second support bracket includes a second support pin extending from the second support bracket substantially parallel to the second interior side of the second roof rail.

6. The stowable roof rack of claim 5 wherein the first support bracket includes a first flange and a second flange substantially perpendicular to the first flange, the first flange connected to the first interior side of the first roof rail and the first support pin extending from the second flange.

7. The stowable roof rack of claim 6 wherein the crossbar includes a longitudinal member having a first distal end defining a first hole and a second distal end defining a second hole, the first hole and the second hole oriented substantially perpendicular to the longitudinal member and sized to receive the first support pin, the second support pin, the first storage pin, or the second storage pin.

8. A stowable roof rack for a roof of a motor vehicle comprising:
   a first roof rail connected to the roof of the motor vehicle, the first roof rail having a first exterior side facing outwardly relative to the motor vehicle and a first interior side facing inwardly relative to the motor vehicle;
   a second roof rail connected to the roof of the motor vehicle and disposed substantially parallel to the first roof rail, the second roof rail having a second exterior side facing outwardly relative to the motor vehicle and a second interior side facing inwardly relative to the motor vehicle;
   a first storage bracket connected to the first interior side;
   a second storage bracket connected to the first interior side;
   a first support bracket connected to the first interior side;
   a second support bracket connected to the second interior side; and
   a crossbar moveable between a stowed position and a deployed position, wherein when in the stowed position the crossbar is connected at a first end to first storage bracket and at a second end to the second storage bracket, and wherein when in the deployed position the crossbar is connected at the first end to the first support bracket and at the second end to the second support bracket, and wherein when in the stowed position, the crossbar is disposed below an upper edge of the first roof rail when viewed from a side of the motor vehicle, and
   wherein the first storage bracket includes a first storage pin extending out from the first storage bracket substantially perpendicular to the first interior side of the first roof rail, the second storage bracket includes a second storage pin extending out from the second storage bracket substantially perpendicular to the first interior side of the first roof rail, the first support bracket includes a first support pin extending from the first support bracket substantially parallel to the first interior side of the first roof rail and the second support bracket includes a second support pin extending from the second support bracket substantially parallel to the second interior side of the second roof rail.

9. The stowable roof rack of claim 8 wherein the first interior side and the second interior side are vertical relative to the motor vehicle and substantially planar.

10. The stowable roof rack of claim 8 wherein the first storage bracket is disposed forward, relative to the motor vehicle, of the first support bracket and the second support bracket.

11. The stowable roof rack of claim 8 wherein the first storage pin, second storage pin, first support pin, and second support pin are identical in size.

12. The stowable roof rack of claim 8 wherein the first support bracket includes a first flange and a second flange substantially perpendicular to the first flange, the first flange connected to the first interior side of the first roof rail and the first support pin extending from the second flange.

* * * * *